United States Patent Office 2,790,713
Patented Apr. 30, 1957

2,790,713

PROCESS FOR OBTAINING NICKEL AND COBALT FROM A MIXED SULPHIDE MATTE

Heine Kenworthy, Rolla, Mo.

No Drawing. Application December 15, 1952,
Serial No. 326,173

5 Claims. (Cl. 75—82)

(Granted under Title 35, U. S. Code (1952), sec. 266)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to the concentration of constituents from a heterogeneous mixture of metallic sulfides, and more particularly to the concentration of the cobalt and nickel values from a matte containing sulfides of cobalt, nickel and copper and may contain sulfides of iron and lead.

Heretofore, such mattes as above described were smelted and slagged with various treatments to separate the copper values while the cobalt values and nickel were mostly lost in the slag or in copper refining. It has now been discovered that the cobalt values can be concentrated with a nickel fraction in such mattes by the procedure now to be described.

This invention, accordingly, has for its object the concentration of the cobalt and nickel contents of a matte containing the sulfides of cobalt, nickel, copper, lead and iron. It is not necessarily essential that iron or lead be present and, in fact, a concentrate of cobalt or nickel can be separated from a copper matte containing also a sulfide of cobalt or of nickel. It has been discovered that, in a mixed sulfide matte containing, for example, cobalt, nickel, copper, lead and iron, the addition of a metallic oxide thereto, preferably the oxide of a metal already present, will first reduce the cobalt and nickel values and part of the iron to the metallic form and thereafter the remainder of the iron and the copper-lead values are reduced by subsequent additions. Since metallic cobalt and nickel are paramagnetic while the sulfides of copper are not, it thus becomes possible to separate a concentrate by magnetic means which contains the cobalt and nickel enriched fraction while rejecting from the concentrate the unchanged copper sulfides.

This invention, accordingly, provides a process for the concentration of the cobalt and nickel content of a matte containing the sulfides of cobalt, nickel, copper and iron or lead by heating such a matte to fusion and reacting therewith at least one oxide selected from the group consisting of the oxides of cobalt, copper and iron in an amount sufficient to react with sulfides of cobalt and nickel, then cooling the resulting mixture to solidification, comminuting the cooled solid mixture, and magnetically separating a concentrate containing metallic cobalt and nickel from a non-magnetic residue containing copper.

The invention is predicated upon the observation that an oxide of cobalt, nickel, copper or iron, when fused with a mixture containing the sulfides of at least one metal selected from the group consisting of cobalt, copper, nickel and iron, will selectively reduce the sulfides to their metals in the sequence cobalt, nickel, iron, lead, copper. Apparently, the selective reduction is a function of free energies, and the reaction velocities for cobalt and for nickel are substantially higher than for iron, lead or copper. Accordingly, it becomes possible to selectively reduce the cobalt and nickel content, thus converting it into a paramagnetic form, while maintaining the sulfides of copper in the non-magnetic form.

Suitable mattes for treatment in accordance with this invention include mixtures of the sulfides of cobalt and copper, or copper and nickel, or cobalt, copper and nickel. The mixed sulfides may also contain the sulfides of iron and/or lead.

Suitable oxides for employment as reactants in accordance with this invention include those which will not contaminate the matte with undesirable metals. For example, the oxides of iron, cobalt, nickel and copper may readily be employed. Preferably, an amount of oxide is employed sufficient to react with the matte content of cobalt and nickel together with a slight excess of about 10 percent over the stoichiometric proportions. In general, the matte to be treated is crushed preferably to about minus 28-mesh and the oxide selected is similarly crushed and thoroughly mixed with the matte. Thereafter, the mixture is fused at a temperature of about 1200 to 1350° C. and slowly cooled. The slow cooling appears to favor segregation of the reduced metal whereby it is more easily separated by subsequent magnetic treatment. After cooling to room temperature the reaction mixture is then crushed and ground to minus 200-mesh and magnetically separated, preferably by an electromagnetic device. After magnetic separation, it is found that the cobalt and nickel content is concentrated in the magnetic fraction and the copper content is concentrated in the non-magnetic fraction.

The following example will illustrate how this invention may be carried out, but it is not limited thereto:

*Example I*

A matte containing appreciable quantities of Fe, Co, Ni, Pb and Cu was crushed to 28-mesh and mixed with 19 percent by weight of minus 100-mesh $Fe_3O_4$, fused at 1350° C. for two hours in a covered clay-bonded graphite crucible, slowly cooled for two days, crushed through 10-mesh, stage ground in a steel ball mill until substantially all of the sulfides were comminuted to minus 200-mesh and were free of metallics, and then magnetically separated in a Davis magnetic tube separator set at 0.5 ampere. The magnetic portion analyzed, in percent, Fe 46, Co 9, Ni 25, Cu 14, Pb 1, and contained, in percentage of the total, Fe 48, Co 93, Ni 91, Cu 9, and Pb 12. The non-magnetic fraction analyzed, in percent, Fe 18, Co 0.25, Ni 0.90, Cu 50, S 21, Pb 3, and contained, in percentage of the total, Fe 52, Co 7, Ni 9, Cu 91, and Pb 88.

*Example II*

Another matte containing, in approximate percent, Fe 12, Co 3, Ni 10, Cu 46, and S 23 was reacted with 19 percent of CuO in a similar manner to that described above. The resulting mixture was crushed, ground, and magnetically separated to produce a magnetic fraction analyzing, in percent, Fe 27, Co 12, Ni 30, Cu 19, and containing, in percent of the total, Fe 45, Co 94, Ni 93, and Cu 7.

It will be apparent from the foregoing that a simple method has been provided for concentrating the cobalt and nickel content of a matte containing the same together with copper or iron or lead. Heretofore, a large proportion of the cobalt content was lost during slagging operations. It is desirable in the practice of this invention to exclude atmospheric oxygen during the fusion stage and in fact to maintain a substantially neutral atmosphere over the molten reaction mixture.

Since many apparently differing embodiments of this invention will readily occur to one skilled in the art, the invention should not be limited to the precise details or

What is claimed is:

1. A process of selectively reducing sulfides of cobalt and nickel contained in a matte in which sulfides of cobalt, nickel and copper are present which consists in heating to fusion temperature an intimate mixture of said matte with at least one oxide selected from the group consisting of the oxides of cobalt, nickel, copper and iron in an amount sufficient to react with sulfides of cobalt and nickel.

2. A process as set forth in claim 1 in which said mixture of matte and oxide is heated to a fusion temperature of about 1200° to 1350° C.

3. A process as set forth in claim 1 in which said matte includes also sulfide of iron.

4. A process as set forth in claim 1 in which said matte includes also sulfide of lead.

5. A process of obtaining cobalt and nickel from a matte containing the sulfides of cobalt, nickel and copper which consists in forming an intimate mixture of said matte with at least one oxide selected from the group consisting of the oxides of cobalt, nickel, copper and iron in an amount sufficient to react with sulfides of cobalt and nickel, selectively reducing the cobalt sulfide and nickel sulfide content of the matte to cobalt and nickel by fusing said mixture to a temperature of about 1200° to 1350° C., cooling the fused mixture and recovering the cobalt and nickel therefrom.

References Cited in the file of this patent

UNITED STATES PATENTS

| | | |
|---|---|---|
| 2,082,284 | Goetz | June 1, 1937 |
| 2,419,973 | Sproule et al. | May 6, 1947 |

FOREIGN PATENTS

| | | |
|---|---|---|
| 152,902 | Australia | Aug. 21, 1953 |